(No Model.) 2 Sheets—Sheet 2.

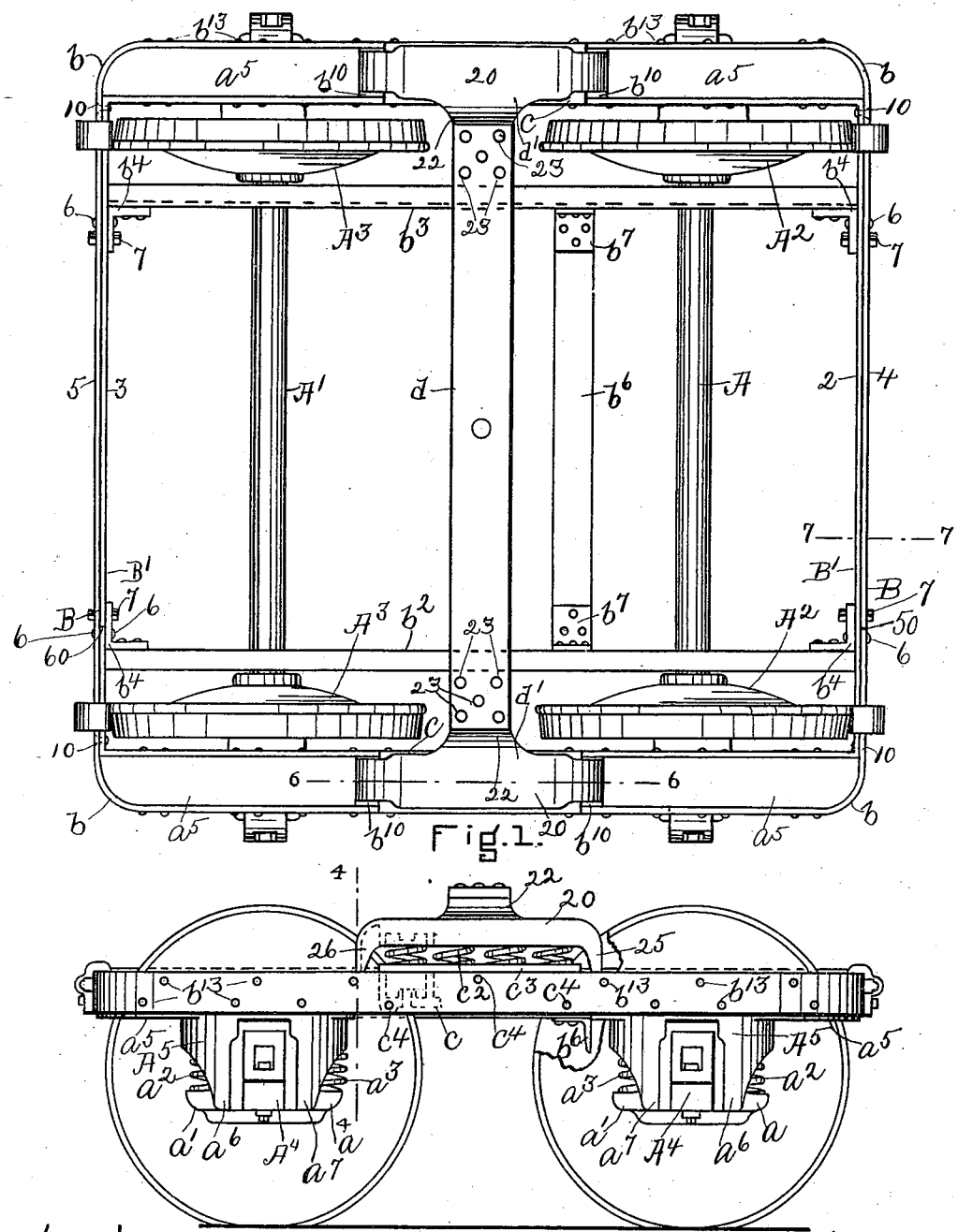

C. F. BAKER.
ELECTRIC CAR TRUCK.

No. 557,535. Patented Apr. 7, 1896.

WITNESSES.
Matthew M. Blunt
J. Murphy

INVENTOR.
Charles F. Baker
by Jas. H. Churchill
ATT'Y.

UNITED STATES PATENT OFFICE.

CHARLES F. BAKER, OF BOSTON, MASSACHUSETTS.

ELECTRIC-CAR TRUCK.

SPECIFICATION forming part of Letters Patent No. 557,535, dated April 7, 1896.

Application filed September 16, 1895. Serial No. 562,610. (No model.)

*To all whom it may concern:*

Be it known that I, CHARLES F. BAKER, a citizen of the United States, and a resident of Boston, county of Suffolk, and State of Massachusetts, have invented an Improvement in Electric-Car Trucks, of which the following description, in connection with the accompanying drawings, is a specification, like letters and numerals on the drawings representing like parts.

This invention relates to car-trucks especially adapted and designed for use on electric-railway systems with car-bodies mounted on two trucks, and has for its object to provide a four-wheel single-motor truck of short wheel-base which is of simple construction, increased strength and durability, and of maximum traction.

In electric-railway systems as now commonly equipped car-bodies mounted on more than one truck are usually made from about twenty-five to thirty feet long, which is too long for a single four-wheel truck and too short for two four-wheel trucks when made of the usual wheel-base and construction.

One feature of this invention consists in a four-wheel truck of sufficiently short wheel-base to permit of the use of two of such trucks under a substantially short car-body— namely, from twenty to thirty feet long.

Another feature of the invention consists in providing a four-wheel truck of short wheel-base in which a center pull of the car-body is obtained.

This invention further has for its object to provide a four-wheel car-truck of short wheel-base in which the parts comprising the truck are reduced to a minimum and are constructed and secured together in such manner as will be described to secure a rigid and durable truck capable of long service at a minimum cost for maintaining the same at the proper standard.

These and other features of this invention will be pointed out in the claims at the end of this specification.

Figure 3:
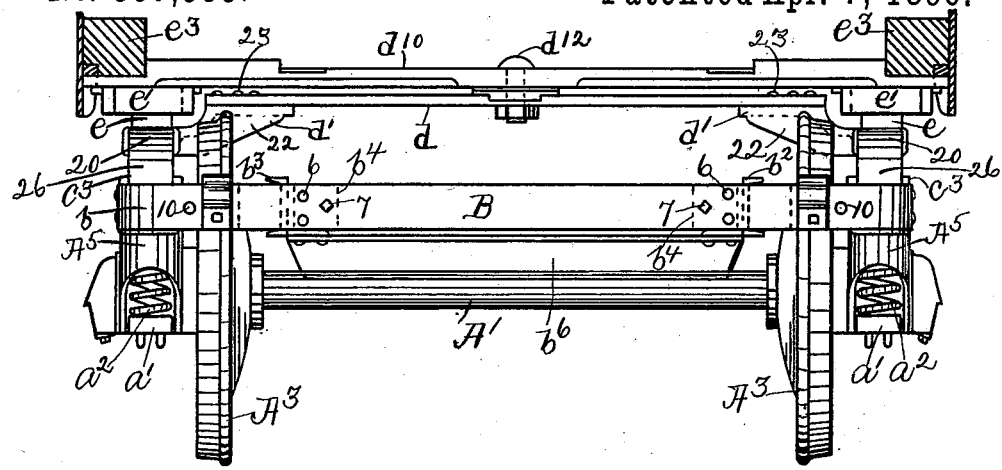
Figures 4, 5:
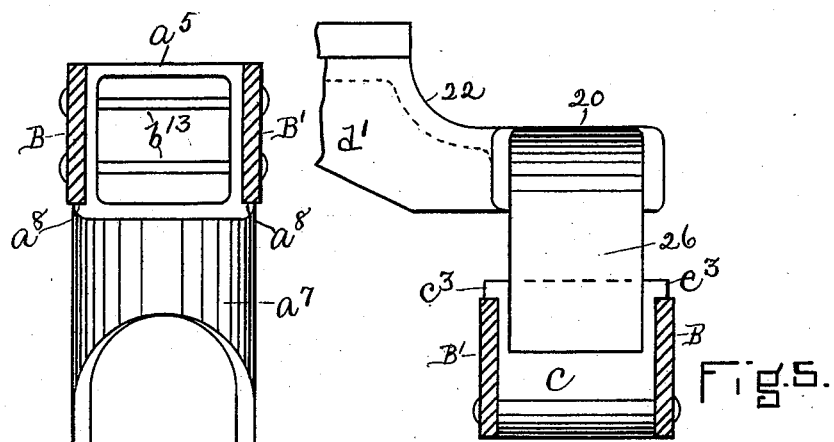
Figure 6:
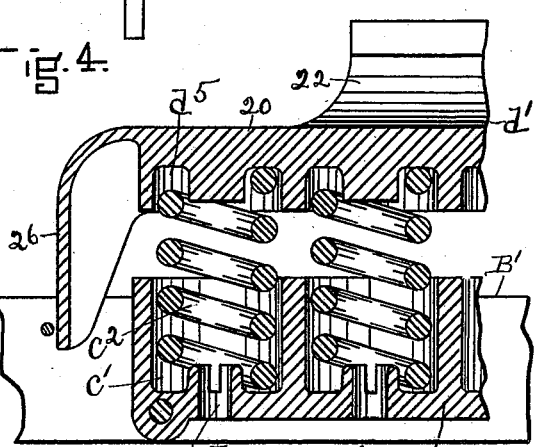

Figure 1 is a top or plan view of a four-wheel electric-car truck embodying this invention; Fig. 2, a side elevation of the truck shown in Fig. 1 with one of the wheels broken away; Fig. 3, an end elevation of the truck shown in Fig. 1, showing also a portion of the car-body; Fig. 4, a sectional detail, on an enlarged scale, on the line 4 4, Fig. 2, looking toward the left; Fig. 5, a sectional detail, on an enlarged scale, on the line 4 4, Fig. 2, looking toward the right; Fig. 6, a sectional detail, on an enlarged scale, on the line 6 6, Fig. 1; and Fig. 7, a sectional detail, on an enlarged scale, on the line 7 7, Fig. 1.

Referring to Fig. 1, A A' represent the car-axles of a four-wheel truck embodying this invention, the said axles having mounted on them two sets of wheels $A^2$ $A^3$, respectively, the said wheels and axles being separated by a substantially short distance, preferably about three feet and six inches.

The car-axles A A' are journaled in suitable boxes $A^4$ of any suitable or desired construction, and each preferably provided with extensions or ears $a$ $a'$ forming seats for the truck-supporting springs $a^2$ $a^3$, located on opposite sides of each journal-box, as clearly shown in Fig. 2, there being a set of springs $a^2$ $a^3$ for each journal of the said axles.

The spiral springs $a^2$ $a^3$ of each set support at their upper end a housing $A^5$, preferably made as herein shown, and comprising a substantially oblong head or upper portion $a^5$, preferably hollow, as represented in Fig. 4, and depending jaws $a^6$ $a^7$, which embrace the journal-box $A^4$, the said jaws being provided with suitable sockets (not shown) or otherwise suitably formed to receive the upper end of the truck-supporting springs $a^2$ $a^3$, as represented in Fig. 2. The jaws $a^6$ $a^7$ are preferably made wider than the head or upper portion $a^5$, so as to form shoulders $a^8$ (see Fig. 4) on opposite sides of the housing for a purpose as will be described. The housings $A^5$ are firmly secured to a truck-frame of a novel construction, as will now be described.

The truck-frame referred to is preferably made as herein shown, and comprises an outer frame B and an inner frame B' of such size with relation to each other that when secured together substantially wide spaces will be left between the side bars of the said frames, while the end bars of the said frames will preferably be in contact with each other, as represented in Figs. 1 and 7.

The outer frame B may and preferably will be formed from a wrought-iron strip of the desired width and thickness and the ends of which are preferably disconnected, but brought substantially in contact with each other, as at 50, Fig. 1, to form a substantially continuous or closed frame, and preferably the corners of the said frame will be made rounding, as at $b$, Fig. 1.

The inner frame B' may and preferably will be formed from a wrought-iron strip of substantially the same width as the frame B, and the ends of the said strip are also preferably brought together, as at 60, Fig. 1, to form a substantially continuous or closed frame, and the end bars 2 3 of the inner frame B' are secured to the end bars 4 5 of the outer frame by rivets 6 and bolts 7, (see Fig. 3,) which may and preferably will be located near the opposite ends of the said end bars on opposite sides of the joint between their ends, as clearly shown in Fig. 1, and to avoid any possibility of the inner frame B' twisting and working loose a rivet 10 is placed close to each corner of the inner frame, as shown in Figs. 1 and 3.

The bolts 7 in the construction herein shown serve a threefold purpose—namely, to join the frames together, to support the hanger of the usual life-guard, and to support the brake relief-spring, the said hanger and relief-spring being not herein shown.

The end bars 2 3 4 5 of the inner and outer frames B B' are tied together by longitudinal tie-bars $b^2$ $b^3$, (see Fig. 1,) located within the frame B' near the side bars and between the car-wheels, the said longitudinal bars being preferably made of channel-iron set on edge, as represented in Fig. 3, and firmly secured to the end bars of the frames B B' by angle-irons $b^4$, which are riveted to the channel-bars and also riveted and bolted to the end bars of the frames B B'.

The truck-frame is strengthened transversely by means of a bar $b^6$, preferably of angle-iron, (see Fig. 2,) which is firmly secured to the longitudinal tie or brace bars $b^2$ $b^3$ by angle-irons $b^7$, which are riveted to the said transverse and longitudinal tie-bars, as shown in Fig. 1.

The transverse bar $b^6$ may and preferably will form the support for one end of the electric motor. (Not herein shown.)

The inner and outer frames B B', as above stated, are made of such size and shape with relation to each other as to leave between their side bars substantially wide spaces $b^{10}$ (see Fig. 1) on opposite sides of the truck, which extend substantially the length of the truck, and up into which are extended the heads $a^5$ of the housings $A^5$, as clearly shown in Figs. 1, 2, and 4, the said housings being firmly secured to the sides of the inner and outer frames B B', preferably by rivets $b^{13}$ extended through the said sides and the head of the housings, the shoulders $a^8$ on the said housings abutting against the under side or edge of the said side bars, as represented in Fig. 4, to avoid shearing or cutting of the rivets $b^{13}$, and thereby strengthening the truck and avoiding repairs in this particular.

The heads of the housings $A^5$ are preferably made rounding at one end, as represented in Fig. 1, to conform to the shape of the corners of the outer frame B. The heads $a^5$ on the housings extend from the corners of the truck toward the transverse center thereof, but are made of such length as will leave the central portion of the space $b^{10}$ open for the reception of a seat for the bolster-sustaining springs, the said seat being preferably made as herein shown and consisting of a substantially-oblong casting $c$ provided with suitable pockets $c'$ for the reception of the spiral springs $c^2$, (see Fig. 6,) herein shown as four in number. (See Fig. 2.)

The spring-seat $c$ is preferably provided with side ledges, ribs, or flanges $c^3$ at its upper end, which extend over the top edge of the side bars of the frames B B', the said spring-seat being firmly secured to the side bars of the frames B B', preferably by rivets $c^4$ (see Fig. 2) extended through the said side bars and the spring-seat.

The heads $a^5$ of the housings $A^5$ and the spring-seat $c$ are preferably made substantially as wide as the space $b^{10}$, so as to fit somewhat snugly between the side bars of the frames B B', and thereby materially strengthen the sides of the truck.

The springs $c^2$ at the opposite sides of the truck support the truck-bolster, which extends transversely across and above the truck, and in order to clear the electric motor carried by the truck, and which is not herein shown, the truck-bolster is preferably made as herein shown, it consisting of a central portion $d$, (see Fig. 3,) preferably a metal bar, and depending end portions or arms $d'$, preferably made detachable from the center portion $d$, and in the present instance each depending end portion is represented as a block or casting 20, adapted to fit over the spring-seat $c$ and provided with a substantially-central upwardly-extended arm or rib 22, which is secured to the end of the center portion or bar $d$ by rivets 23 or in any other suitable manner.

Each block or casting 20 is provided on its under side, as herein shown, with pockets $d^5$ (see Fig. 6) for the reception of the upper ends of the bolster-sustaining springs $c^2$, and in order to relieve the said springs and to effect a loose connection between the car-truck and its bolster, and thereby between the car-truck and the car-body, I prefer to provide the casting or block 20 with depending ears 25 26 at its opposite ends, which project down into the space $b^{10}$ between the ends of the center spring-seat $c$ and the housings $A^5$, as clearly shown in Figs. 1, 2, and 6.

By reference to Figs. 1 and 2 it will be seen that when the truck is started in one direction the housings at one end of the truck will strike against the ears 25, and when started in the opposite direction the housings at the other end of the truck will strike the other ears 26, and the pull upon the car-body will be transmitted to its center, where the truck-bolster is pivotally connected to the car-body bolster $b^{10}$ by the king-bolt or pin $d^{12}$, and while I may prefer to provide the castings or blocks 20 with the depending ears I do not desire to limit my invention in this respect, as they may be entirely omitted and the springs $c^2$ relied upon to transmit the motion of the truck-frame to the bolster, or other means of effecting a loose connection between the truck-frame and the bolster may be employed—such, for instance, as an ear depending from the side of the casting 20, engaging a lug or bracket on the inner side of the side bar of the inner frame B', and not herein shown, or by a pedestal-bolt, (not shown,) which may be secured to the end of the bolster and passed down through the spring $c$ and through a pocket $e^5$ in the spring-seat, the said bolt being fitted loosely in the pocket $e^5$ to allow for wheel movement.

The block or casting 20 is preferably made flat on its upper surface and may be provided with a side bearing-plate $e$, and the truck-bolster $d^{10}$, which may be of any suitable or desired construction, may also be provided with suitable bearing-surfaces $e'$ at its ends, which rest upon the bearing surfaces or plates $e$.

The car-body bolster $d^{10}$ is firmly secured in any suitable manner to the car-body, only the side sills $e^3$ of which are shown in Fig. 3.

The spring-pockets $c'$ in the center spring-seat $c$ may and preferably will have extended through their bottoms a hole $e^5$, which communicates with the spring-pocket and forms an outlet for any water which may accumulate or lodge therein.

From the above description it will be seen that by means of the truck-bolster provided with the raised central portion and the lowered or depending end portions I am enabled to shorten the wheel-base of a four-wheel truck to a minimum, preferably three feet six inches, without interfering with the hanging of the electric motor and without raising the car-body above the track beyond the normal height. Furthermore, by reason of the short wheel-base the wear upon the flanges of the car-wheels and upon the rails when rounding curves is reduced to a minimum, and the car-body being supported by the bolster-sustaining springs and the car-truck being supported by the housing-springs insures an easy-riding car. So, also, it will be seen that the number of parts comprising the truck is reduced to a minimum, with an increase in strength and a decrease in weight, and the cost of maintenance is thereby minimized.

It will be seen that the housings $A^5$ and the spring-seats $c$ may be readily removed, if it is desired or required, by cutting off the rivet-heads and punching out the rivets $b^{13}$ without disturbing the rest of the truck, which is of special advantage in repairs necessitated by accidents.

I claim—

1. In a four-wheel truck, the combination of the following instrumentalities, viz: a truck-frame having each of its sides composed of two sets of bars separated to leave a longitudinally-extended space, housings for the car-axles extended up into said space near the opposite ends of the truck-frame and firmly secured to the said side bars, spring-seats inserted into said space intermediate of the said housings, springs supported by said seats, and a transversely-extended pivoted truck-bolster having its ends supported upon the said springs above the side bars of the truck-frame, substantially as described.

2. In a four-wheel truck, the combination of the following instrumentalities, viz: a truck-frame having each of its sides composed of two sets of bars separated to leave a longitudinally-extended space, housings for the car-axles extended up into said space near the opposite ends of the truck-frame and firmly secured to the said side bars, spring-seats inserted into said space intermediate of the said housings, springs supported by said seats, and a transversely-extended pivoted truck-bolster having its center portion raised or elevated and its ends lowered and supported upon the said springs above the side bars of the truck-frame, substantially as described.

3. In a four-wheel truck, the combination of the following instrumentalities, viz: a truck-frame having each of its sides composed of two sets of bars separated to leave a longitudinally-extended space, housings for the car-axles extended up into said space near the opposite ends of the truck-frame and firmly secured to the said side bars, spring-seats inserted into said space intermediate of the said housings, springs supported by said seats, and a transversely-extended truck-bolster having its center portion raised or elevated and its ends lowered and supported upon the said springs above the side bars of the truck-frame and provided with depending ears extended into the space between the side bars and between the spring-seat and the said housings, substantially as described.

4. In a four-wheel truck, a truck-frame comprising an inner frame and an outer frame fitted one within the other to leave longitudinally-extended side spaces between the side bars of the said frames, two housings extended up into said spaces and firmly secured to the said side bars, journal-boxes for the car-axles provided with extensions forming spring-seats springs inserted between said seats and the said housings, center spring-seats inserted into the said spaces between the said housings and firmly secured to said side bars, springs supported upon said center spring-seats, and a transversely-extended truck-bolster having its ends supported by the said center springs, substantially as described.

5. In a four-wheel car-truck, a truck-frame comprising an inner frame composed of one continuous piece of metal and an outer frame composed of one continuous piece of metal, the said frames being fitted one within the other to leave longitudinally-extended side spaces between the side bars of the said frames, and to have the end bars of the said frames substantially in contact, means to firmly secure together the said end bars, longitudinal brace-bars extended the length of the truck and secured to the said end bars, and a cross-bar secured to the said longitudinally-extended brace-bars, substantially as described.

In testimony whereof I have signed my name to this specification in the presence of two subscribing witnesses.

CHARLES F. BAKER.

Witnesses:
JAS. H. CHURCHILL,
J. MURPHY.